United States Patent [19]

Pischke

[11] Patent Number: 5,309,883
[45] Date of Patent: May 10, 1994

[54] METHOD FOR OPERATING AN INTERNAL COMBUSTION ENGINE

[75] Inventor: Reiner Pischke, Bad Friedrichshall, Fed. Rep. of Germany

[73] Assignee: Audi AG, Ingolstadt, Fed. Rep. of Germany

[21] Appl. No.: 975,925

[22] PCT Filed: Jul. 4, 1991

[86] PCT No.: PCT/EP91/01251
§ 371 Date: Feb. 18, 1993
§ 102(e) Date: Feb. 18, 1993

[87] PCT Pub. No.: WO92/04535
PCT Pub. Date: Mar. 19, 1992

[30] Foreign Application Priority Data

Sep. 7, 1990 [DE] Fed. Rep. of Germany ....... 4028443

[51] Int. Cl.⁵ .................. F02D 7/00; F02M 51/00
[52] U.S. Cl. ................ 123/397; 123/52 MB; 123/479
[58] Field of Search ........... 123/52 M, 52 MB, 479, 123/397, 406, 396; 73/118.2

[56] References Cited

U.S. PATENT DOCUMENTS

| | | | |
|---|---|---|---|
| 4,722,307 | 2/1988 | Okuno et al. | 123/52 MB |
| 4,903,526 | 2/1990 | Miyama et al. | 73/117.3 |
| 5,014,673 | 5/1991 | Fujimoto et al. | 123/52 MB |
| 5,027,769 | 7/1991 | Yoshida et al. | 123/52 M |
| 5,105,774 | 4/1992 | Piccini | 123/52 MB |
| 5,233,958 | 8/1993 | Knoss et al. | 123/396 |

FOREIGN PATENT DOCUMENTS

| | | |
|---|---|---|
| 3145732 | 5/1983 | Fed. Rep. of Germany . |
| 3301743 | 7/1984 | Fed. Rep. of Germany . |
| 3529388 | 2/1987 | Fed. Rep. of Germany . |
| 3904412 | 8/1989 | Fed. Rep. of Germany . |
| 4026853 | 2/1991 | Fed. Rep. of Germany . |
| 60-222544 | 11/1985 | Japan . |

Primary Examiner—Noah P. Kamen
Assistant Examiner—Erick Solis
Attorney, Agent, or Firm—Lalos & Keegan

[57] ABSTRACT

The invention concerns a method of operating an internal-combustion engine, in particular a vehicle engine, in which air is fed to the combustion chambers through an induction manifold in which different induction-pipe lengths and/or volumes for resonance-mode or pulse-mode supercharging can be included, a switchover unit monitoring operation and initiating corrective measures in the event of an out-of-adjustment condition occurring.

8 Claims, 3 Drawing Sheets

METHOD FOR OPERATING AN INTERNAL COMBUSTION ENGINE

BACKGROUND OF THE INVENTION

The invention relates to a method for operating an internal combustion engine, especially in a motor vehicle.

To enable efficient operation of internal combustion engines with as little pollution as possible, especially in motor vehicles, their control sophistication is being continuously increased. Thus, among other things, ignition control and fuel metering are becoming more and more complicated and the induction systems are being improved. It is known by DE-A-35 29 388, for example, that to achieve good filling of the combustion chambers over the rpm range of the internal combustion engine, an induction manifold can be provided, in which—in the lower rpm and load range—long induction pipes (tuned induction pressure charging [resonance mode]) and—in the upper rpm range—short induction pipes take effect with an increased induction volume. Switching over in the form of throttle valves generally takes place depending on rpm and/or depending on induction pipe pressure. However, it is of decisive importance that these measures for improving the power and efficiency with favorable pollutant values interact without problems.

In addition, by virtue of DE-A-39 04 412, an induction system is known with an air flow rate and—associated with it—fuel metering, on the one hand, which are controlled via a main throttle valve, and in the idle range are controlled via a bypass system which bypasses the main throttle valve. There is a memory which stores a numerous reference values of the pressure in the induction area which are derived in agreement with the engine rpm and the degree of opening of the throttle valve. Furthermore, there is a pressure transducer for sampling the pressure in the induction port, and an engine rpm sensor. A throttle valve position transducer samples the degree of opening of the throttle valve; another position transducer determines the degree of opening of the valve in the bypass. To monitor the systems, there are comparator means which compare the pressure value measured by the pressure transducer to a reference pressure derived from the memory and which deliver an error signal when the sampled pressure does not match the computed reference pressure. The error signal can thus lead, for example, to cutoff of fuel feed.

SUMMARY OF THE INVENTION

The object of the invention is to demonstrate a method of the generic type with which faults in the switching-over of the efficient induction areas can be recognized, and (if necessary) at least partially offset.

According to the invention, it is therefore proposed that the switching function of the induction manifold be monitored, and, in case of maladjustment of the switching means, measures be initiated. In the simplest case these measures can be the triggering of a warning display which indicates to the operator that the internal combustion engine is not operating in a regular and proper manner. However the measures can preferably be the triggering of a error memory from which, for example, the type of problem and (if necessary) its duration can be retrieved in a service station by readout of the error memory. Alternatively or in addition to this, in the course of control of the internal combustion engine, for example by ignition intervention (shifting of the ignition point), or by intervention in the fuel metering or in the exhaust gas recirculation, measures can be initiated which compensate for the adverse effects on engine operation and/or exhaust gas emissions caused by maladjustment of the switching means.

Electrical (potentiometer) or electromechanical position sensors which deliver a fault signal when the switching means are maladjusted can be placed on the switching means of the induction manifold.

In a preferred embodiment, the combustion air flow rate or capacity of the internal combustion engine is used as the monitored parameter. In doing so, it must be taken into account that (for example) for fuel metering, the capacity of the internal combustion engine is computed anyway, so that the control sophistication necessary for this purpose is generally already present.

By comparing these desired values—which are present in regular engine operation for the combustion flow rate or capacity—to the actual values, it can thus be determined at relatively low structural cost whether the switching means in the induction manifold are maladjusted, because then the actual values are below the desired values in any case. In doing so it can be advisable to take into account the absolute air pressure at the same time in order to preclude incorrect error messages during major air pressure fluctuations.

BRIEF DESCRIPTION OF THE DRAWINGS

The invention is described below with reference to the accompanying schematic drawings in which.

DESCRIPTION OF THE PREFERRED EMBODIMENTS

Figure 1:
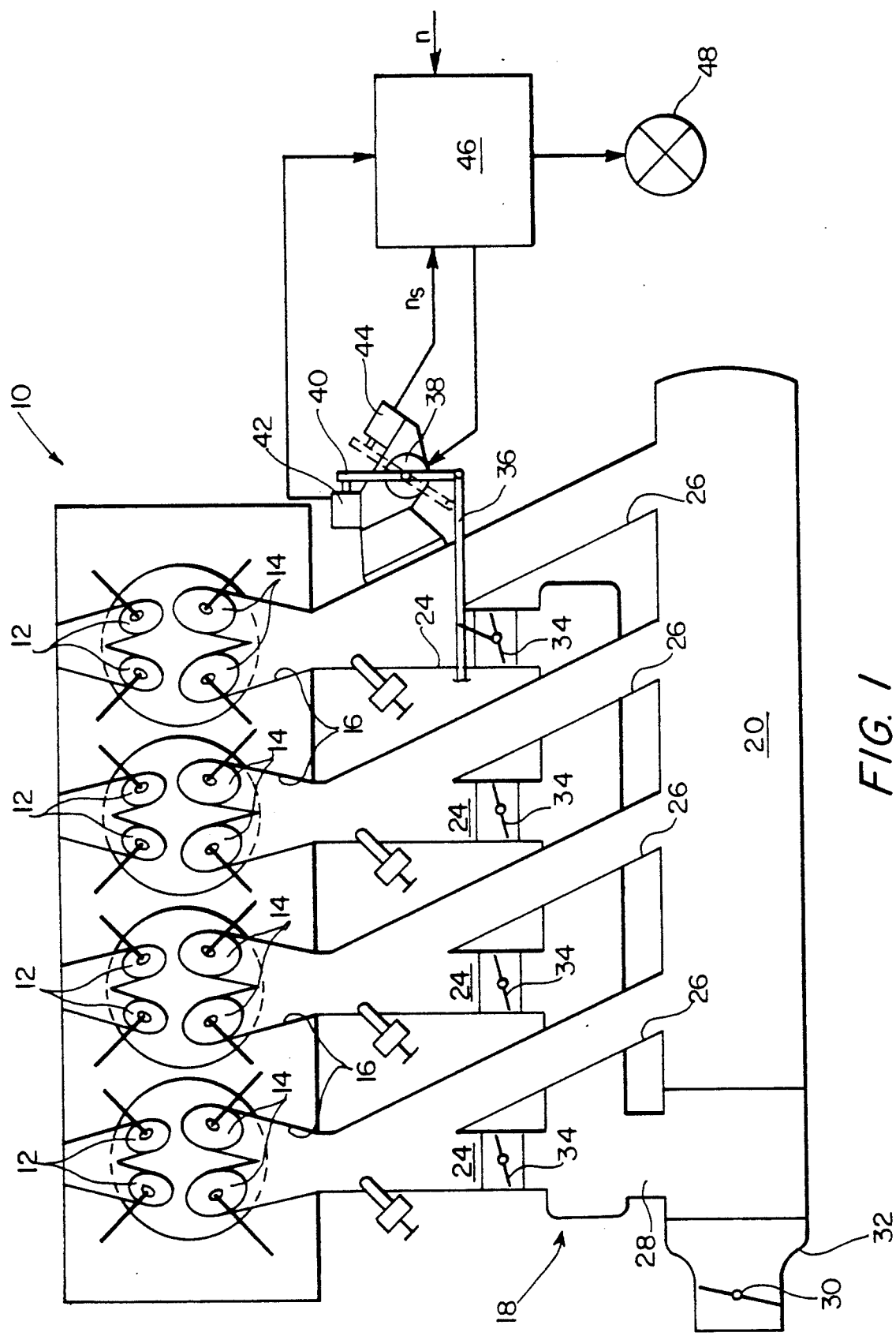
FIG. 1 shows a four cylinder reciprocating internal combustion engine which has an induction manifold with short and long induction pipes, as well as switching means for switching over.
Figure 2:
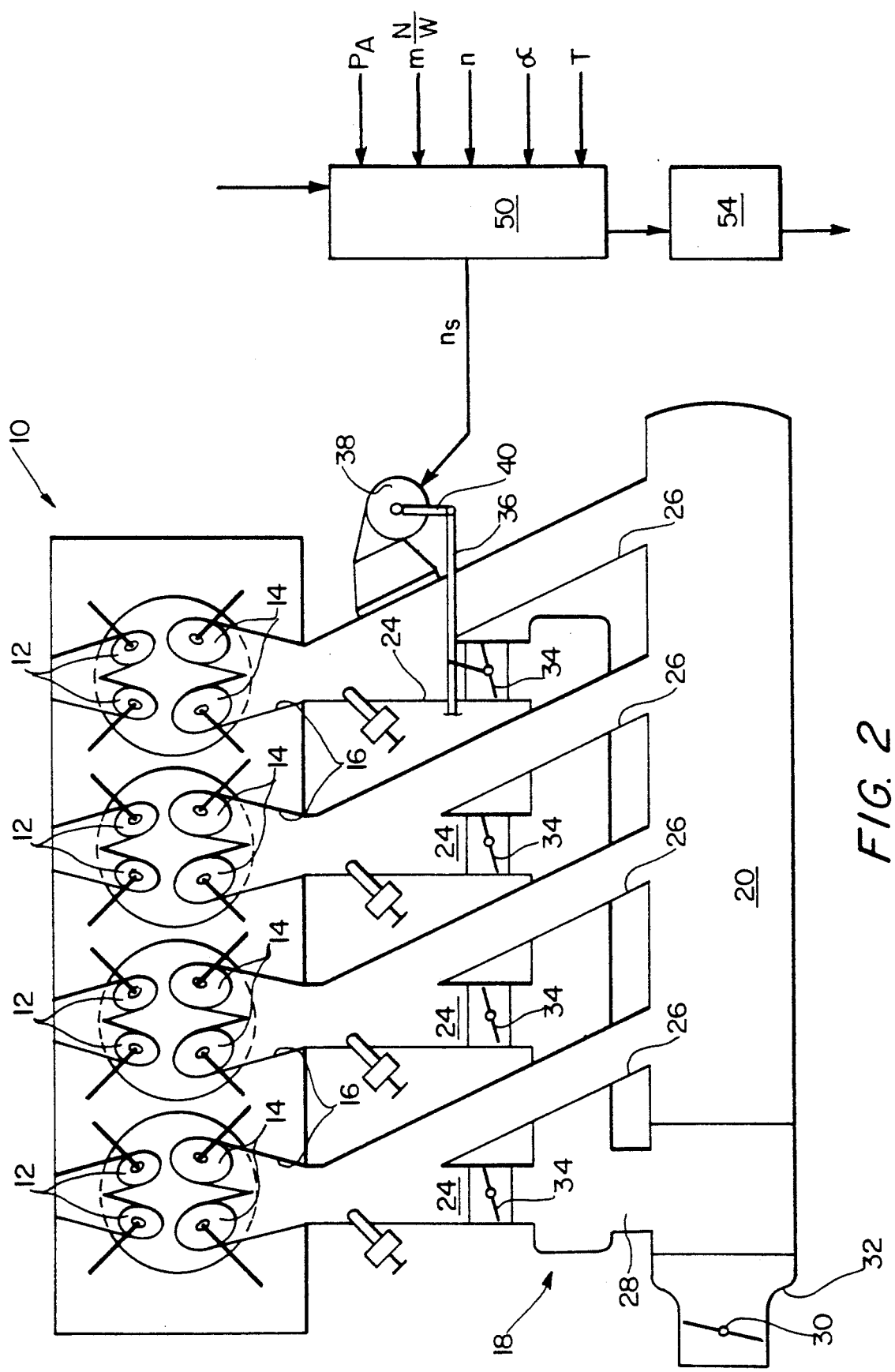
FIG. 2 shows another induction manifold in an essentially identical design, but with a control device for monitoring the switching means, depending on the capacity of the internal combustion engine.
Figure 3:
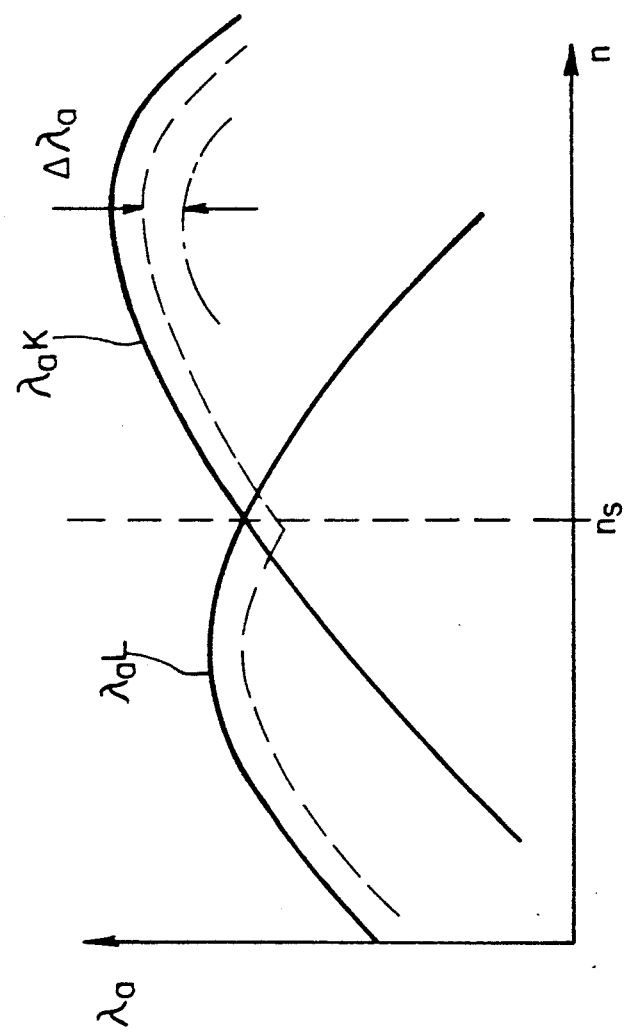
FIG. 3 shows a capacity curve of the induction pipe as of FIG. 2 over the rpm of the internal combustion engine.

Referring to the illustration of the present invention shown in FIGS. 1-3, FIG. 1 schematically shows the cylinder head 10 of a four cylinder reciprocating internal combustion engine with two exhaust valves 12 and two intake valves 14 per cylinder. The intake valves 14 control one induction port 16 per cylinder for which one induction manifold 18 is connected in the conventional manner to the induction ports 16.

The induction manifold 18 is composed essentially of a first header 20, a second header 22, one short individual pipe 24 and one long individual pipe 26 per cylinder of the internal combustion engine. The individual pipes 24 empty into the header 22 in this case, while the individual pipes 26 enter the header 20. The individual pipes 24, 26 combine into a common single pipe in front of the connection to the induction ports 16. The headers 20, 22 are interconnected via a connecting pipe 28.

In the header 20, in its induction connection 32 is an arbitrarily controllable throttle valve 32 which is connected to the gas pedal of the motor vehicle (this is not shown) and which is used to control the performance of the internal combustion engine.

In addition, in the short individual pipes 24 are butterfly valves 34 which, in one of their positions (as shown), close the short individual pipes 24, while in the other end position completely open them.

The butterfly valves 34 are actuated via a rod assembly 36, which is only partially shown, and an electric motor 38. The electric motor 38 has a two-armed lever 40 here; the actuating rod 36 engages one end of the two armed-lever, while the other end interacts with two position sensors 42, 44.

The electric motor 38 is triggered via a control device 46 which, among others, processes a rpm signal n of the internal combustion engine. Butterfly valves 34 are controlled in this process such that they are closed at a speed n<3000 rpm, and at a switching speed ns of 3000/minute, they are swivelled into their open position by a corresponding signal to the electric motor 38. In the open or closed position of the butterfly valves 34 the free arm of lever 40 lies either against the position sensor 42 or position sensor 44 so that the actual position of the butterfly valves 34 is indicated to the control device 46 via these sensors.

If the butterfly valves are out of adjustment, i.e., for example when the electric motor 38 fails at a speed of >3000/minute the butterfly valves 34 are still closed, the problem is recognized via the control device 46, and an error message is output to a warning indication 48. Maladjustments can also be caused by only partially closed butterfly valves 34 (position sensors 42 and 44 not actuated).

FIGS. 2 and 3 show another version in which the same parts are labeled with the same reference symbols.

Instead of position sensors 42, 44, the position of the butterfly valves 34 in the short individual pipes 24 is monitored depending on the capacity of the internal combustion engine. To do this there is a central computer 50 (commercial name, for example, Motronic) which first calculates the ignition control and fuel metering to the injection valves 52 in the conventional manner. Among others, the following valves are sent to the central computer 50 in this process:

$P_A$ = absolute air pressure
P = pressure in the induction manifold 18
m = air mass/amount (determined, for example, by means of a hot wire or a swing-out butterfly valve in the induction area)
n = engine rpm
α = load state (for example, by opening of throttle valve 32)
T = temperature of the internal combustion engine.

The capacity λa is computed using the following equation $$\lambda_a = K \cdot (m/n)$$

in which K is a constant. λa is the basis of the calculation of the injection amount per work cycle of the internal combustion engine.

In the induction manifold 18 which is shown with switching ns of the butterfly valves 34 at, for example, 3000/minute, in the full load position (throttle valve 30 fully opened) there is a capacity curve as shown in FIG. 3 in the solid lines. For regular switching of butterfly valves 34, the curve segment λaL (below the revolutions per minute ns) for ns changes into curve segment λaK, which is rising again, while when butterfly valves 34 are out of adjustment the underlying solid curve segments would be relevant.

The curve behavior shown in FIG. 3 (for regular operation) is stored as a setpoint in the central computer 50 in an operating map in addition to the other curve behaviors for other load states and is continually compared to the actual values in engine operation. If the actual values do not reach a specific threshold (broken line), maladjustment of butterfly valves 34 is recognized, and an error message is delivered to a read-out error memory 54.

In addition, an auxiliary program with changed ignition and fuel metering measurement values is started in the central computer 50 with the error message.

To prevent incorrect error reports during larger air pressure fluctuations, the absolute air pressure $P^a_{bs}$ is also processed in the central computer at the same time, and the setpoint curve or threshold curve is shifted down in the operating map as the air pressure decreases (for example, as is indicated with the dot-dash line). However, the actual values can also be modified with an air pressure-dependent correction factor.

Differing from the version described last, the flow rate of combustion air in the induction manifold 18 can also be used to assess the operation of butterfly valves 34, for example, by the corresponding pressure sensors or by butterfly valves which can be swung out by the air flow within the induction manifold 18.

I claim:

1. In a motor vehicle having an internal combustion engine, said engine comprising a plurality of combustion chambers, an induction manifold for supplying air to the combustion chambers, at least one arbitrarily controllable throttle valve for controlling the air supplied to the manifold, the manifold including one short pipe for each chamber, one long pipe for each chamber and a means for switching between the short and long pipe for tuned induction pressure charging, a method for operating the engine comprising the steps of:

determining the pressure of the air fed to the manifold by the at least one throttle valve;
   monitoring the switching means of the induction manifold for maladjustment;
   upon maladjustment, outputting an error message; and
   intervening with the engine control, and
   wherein the step of monitoring the switching means comprises the steps of:
   predetermining a regular combustion air flow rate;
   determining the actual combustion air flow rate in the induction manifold; and
   comparing the actual flow rate to the regular flow rate;
   upon determining that the actual flow rate is less than the regular flow rate, indicating a maladjustment, and
   wherein said internal combustion engine has fuel injection and engine capacity is computed using the following equation:

$$\lambda_a = K(m/n)$$

where
   $\lambda_a$ = engine capacity,
   K = a constant
   m = air mass/amount
   n = engine speed;

wherein the step of monitoring the switching means comprises the steps of:

determining a regular capacity value of the engine, determining an actual capacity value of the engine;

comparing the actual capacity value to the regular capacity value; and upon determining that the actual capacity value is less than the regular capacity value, reporting a maladjustment, and wherein the step of comparing the actual capacity value to the regular capacity value comprises the steps of:

generating at least one capacity curve of the induction manifold comparing the capacity $\lambda_a$ to the engine speed n;

storing the at least one capacity curve in an operating map;

comparing the desired capacity value to the actual capacity value using the at least one capacity curve; and upon determining that the actual capacity value is less than a predetermined threshold value, reporting a maladjustment.

2. A method according to claim 1, wherein position sensors are provided on the switching means, whereupon said step of outputting an error message upon maladjustment includes delivering a fault signal generated from the position sensors.

3. A method according to claim 1, wherein the step of storing the operating map includes considering the absolute air pressure, and upon a decrease in the air pressure, shifting the desired capacity value and the actual capacity value accordingly.

4. A method according to claim 1, further comprising the steps of:

determining whether the switching means of the induction manifold is out of adjustment, and if the switching means is out of adjustment, triggering a warning indicator.

5. A method according to claim 1, further comprising the steps of:

determining whether the switching means of the induction manifold is out of adjustment, and if the switching means is out of adjustment, inputting a corresponding error message into a readable error memory.

6. A method according to claim 1, further comprising the steps of:

determining whether the switching means of the induction manifold is out of adjustment, and if the switching means is out of adjustment, changing at least one parameter of engine control which influence exhaust gas emission.

7. A method according to claim 6, wherein the at least one parameter is the ignition point.

8. A method according to claim 6, wherein the at least one parameter is the fuel metering.

* * * * *